Nov. 13, 1934.   G. K. SPOOR   1,980,600
MOTION PICTURE PROJECTION MACHINE
Filed Dec. 14, 1932   3 Sheets-Sheet 2

INVENTOR:
George K. Spoor
by Darby & Darby
Attys.

Nov. 13, 1934.  G. K. SPOOR  1,980,600
MOTION PICTURE PROJECTION MACHINE
Filed Dec. 14, 1932  3 Sheets-Sheet 3

Inventor:
George K. Spoor
by Darby & Darby
Attys.

Patented Nov. 13, 1934

1,980,600

UNITED STATES PATENT OFFICE 1,980,600

MOTION PICTURE PROJECTION MACHINE

George K. Spoor, Chicago, Ill., assignor to Spoor Natural Vision Corporation, Chicago, Ill., a corporation of Illinois Application December 14, 1932, Serial No. 647,174

7 Claims. (Cl. 88—17)

This invention relates to improvements in motion picture projecting apparatus, and more particularly to devices for preventing buckling of the film at the projection aperture in the projection head of the apparatus.

An important object of this invention is to provide a mechanism in which the film at the aperture is steadied and held motionless during the period of exposure.

Another object of the invention is to provide an apparatus by means of which the film may be caused to assume an approximately spherical shape in order to conform with the spherical surface of the projecting lens.

A still further object of this invention is to provide mechanism for supporting the film loop which is formed in the film before it reaches the film gate.

A still further object of this invention is to accomplish the above results with the mechanism employing compressed air or gas properly directed to act as a sort of pressure finger to support the loop and to properly shape and steady the film at the film aperture.

The invention consists substantially in the structure, combination and arrangement hereinafter to be described, as illustrated in the accompanying drawings, and finally pointed out in the appended claims.

This application is a continuation in part of my copending application Serial No. 327,219, filed December 20, 1928.

Referring to the drawings—

Figure 1:
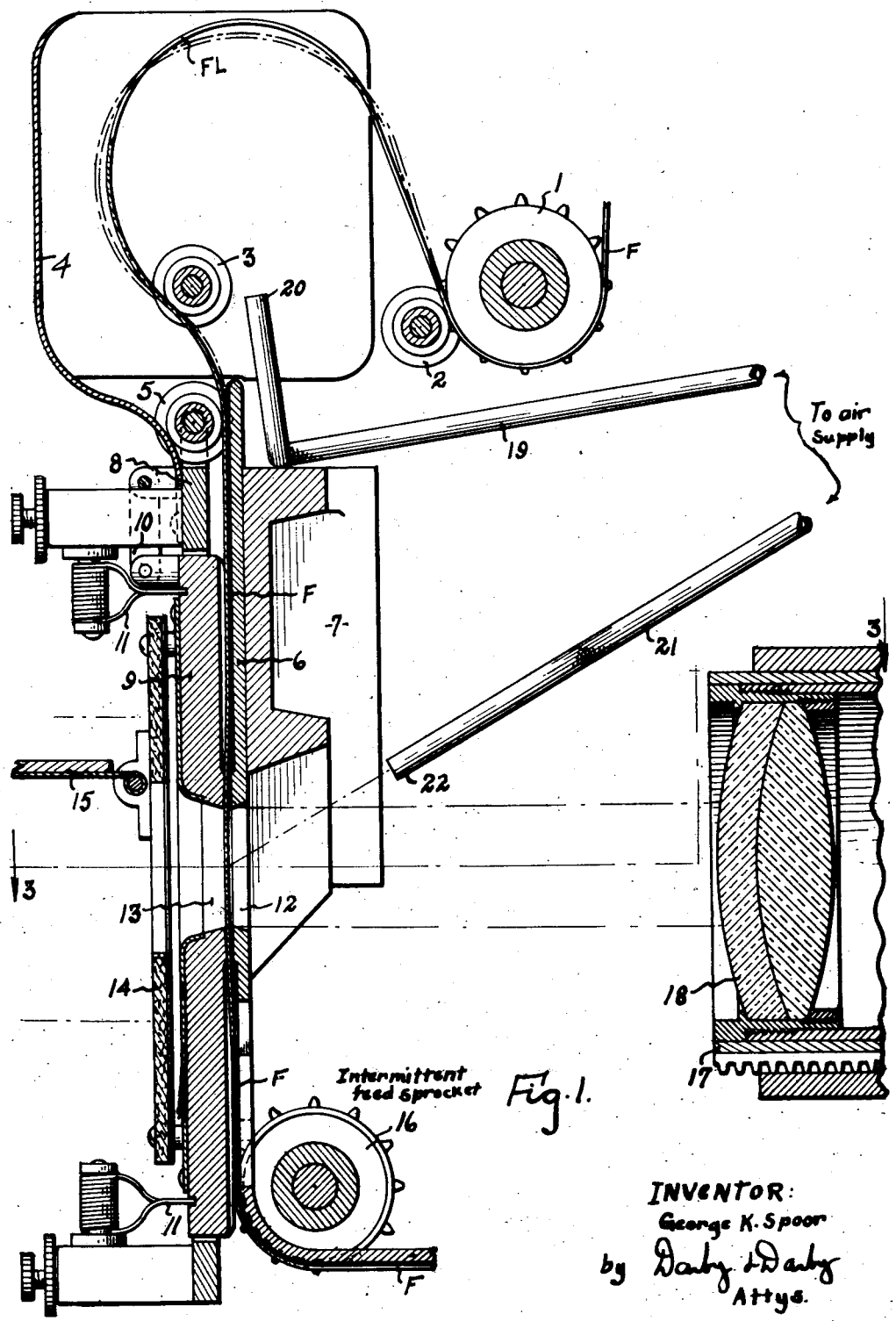
Figure 1 is a vertical central cross-sectional view through the parts of this apparatus illustrating the structure and principle of this invention.

It is ordinary practice in motion picture projecting apparatus to thread the film as it is drawn from the pay-off reel or magazine through a slot in the top of the projector head between guides located adjacent the slot; thence to and around the continuously driven upper feed sprockets, at the delivery side of which the film is formed into a free loop; thence passing over a guide and into the film gate and past the aperture thereof; thence to and around the intermittently active feed sprockets and is then formed into the lower free loop at the delivery side of the intermittent feed sprockets; then the film passes to and around the lower continuously driven feed sprockets and between guides and out of the projector head through a slot in the bottom thereof; and, finally, to the take-up reel.

In operation the upper and lower feed sprockets are continuously driven to effect continuous longitudinal feed of the film at the points where these sprockets respectively engage the film. The intermittently acting feed sprockets are located intermediate the upper and lower continuous feed sprockets, and usually at a point below the aperture of the projector head. The intermittently acting feed sprockets are guided periodically to effect the step by step feed or progression of the film past the aperture, the periods of rest of the intermittent feed corresponding with the periods during which the successive pictures on the film remain stationary, framed in the aperture for projection onto the screen. The movement of the intermittent feed sprockets effects the removal of the picture frames from the aperture and the replacement thereof of the next succeeding picture frame on the film into framed relation with the aperture. The upper and lower free loops formed in the film permit the intermittent feed action without disturbing the continuous feed action of the upper and lower feed sprockets. The intermittently acting sprockets, when thrown into operation, impose a sudden pull or jerk upon the film which ordinarily causes a sharp snap or whipping action in the upper free loop of the film, and this tends to set up a reaction throughout the length of that portion of the film which lies within the film gate. The result is that this portion of the film, and especially that part thereof which is framed in the aperture, is liable to become displaced or to be given a shaking or trembling movement. This causes a flicker or blur in the picture that is projected from the film onto the screen. Such flicker imposes a strain on the optic nerves of the observer, thereby impairing the smoothness and softness of the projected picture.

The size of the upper free loop is also of such proportion that, due to the pull or jerk on the film as it is fed intermittently, it tends to vibrate or flop about, which movement is likewise transmitted through the film to that portion lying in the film gate.

Heretofore it has been the common practice to have the film, where it is framed in the aperture, lie in a plane at right angles to the axis of the projecting lenses, with the result that there is some tendency of the projected picture to be blurred at the edges because of the lack of conformity between the plane surface of the projected film and the curved surface of the projecting lenses. This blur is more prevalent and noticeable in projecting apparatus employing the so-called wide film, which is considerably larger in proportion to the standard motion picture film requiring a larger projection aperture so that the outer portions of the picture at the aperture are more greatly out of alignment with the shape of the projection lenses.

The vibration of the film and buckling thereof at the projection aperture and the flopping or vibration of the upper free loop are likewise more prevalent in the case of the so-called wide film.

The general objects of this invention are to eliminate the above discussed difficulties and to employ compressed air or gas for the purpose of accomplishing their elimination.

The structure by means of which these advantages in operation are obtained will now be described in detail in connection with the accompanying drawings.

In the drawings there has been shown only so much of a projection machine, particularly with relation to the film gate, feeding mechanism and projecting lenses, as will be necessary to thoroughly understand and practice the invention. The film F is delivered from the upper supply or pay-off magazine (not shown) to the upper continuously driven feed sprocket 1 and is guided therefrom by means of a guide roller 2 into the upper film loop FL within a protecting shield 4. The film is then guided from the loop past a second film guide 3 to a third film guide 5, which is mounted upon the forward aperture plate support 8 which is mounted on the rear aperture plate by means of a hinge 23 of the usual construction.

The rear aperture film plate 6 is mounted upon a suitable support 7, which may or may not be part of the projecting head apparatus. The forward aperture plate 9 is supported in an opening in the supporting plate 8 by means of links 10 and is resiliently pressed against the rear aperture plate 6 by means of suitable spring fingers 11 and adjusting mechanism for varying the pressure of these fingers thereon. The rear aperture plate 6 is provided with the aperture 12 in alignment with the corresponding aperture 13 formed in the forward aperture plate 9. At 14 is the usual heat insulating shield mounted upon and in front of the forward aperture plate 9, which in turn has an aperture of sufficient size and shape and properly aligned to permit the passage of light therethrough to the apertures 12 and 13. At 15 is shown the usual safety or fire shutter normally employed with this apparatus.

The film F after passing through the film guide engages the intermittently active feed sprockets 16 which may be driven by anyone of a number of well known forms of intermittently acting operated mechanism. The film F then passes over the necessary guides to the take-up magazine or reel (not shown) at the bottom of the projection head. At 17 is shown a portion of the projecting lens tube in which curved or convex projecting lenses 18 of any well known form are mounted.

Figure 2:
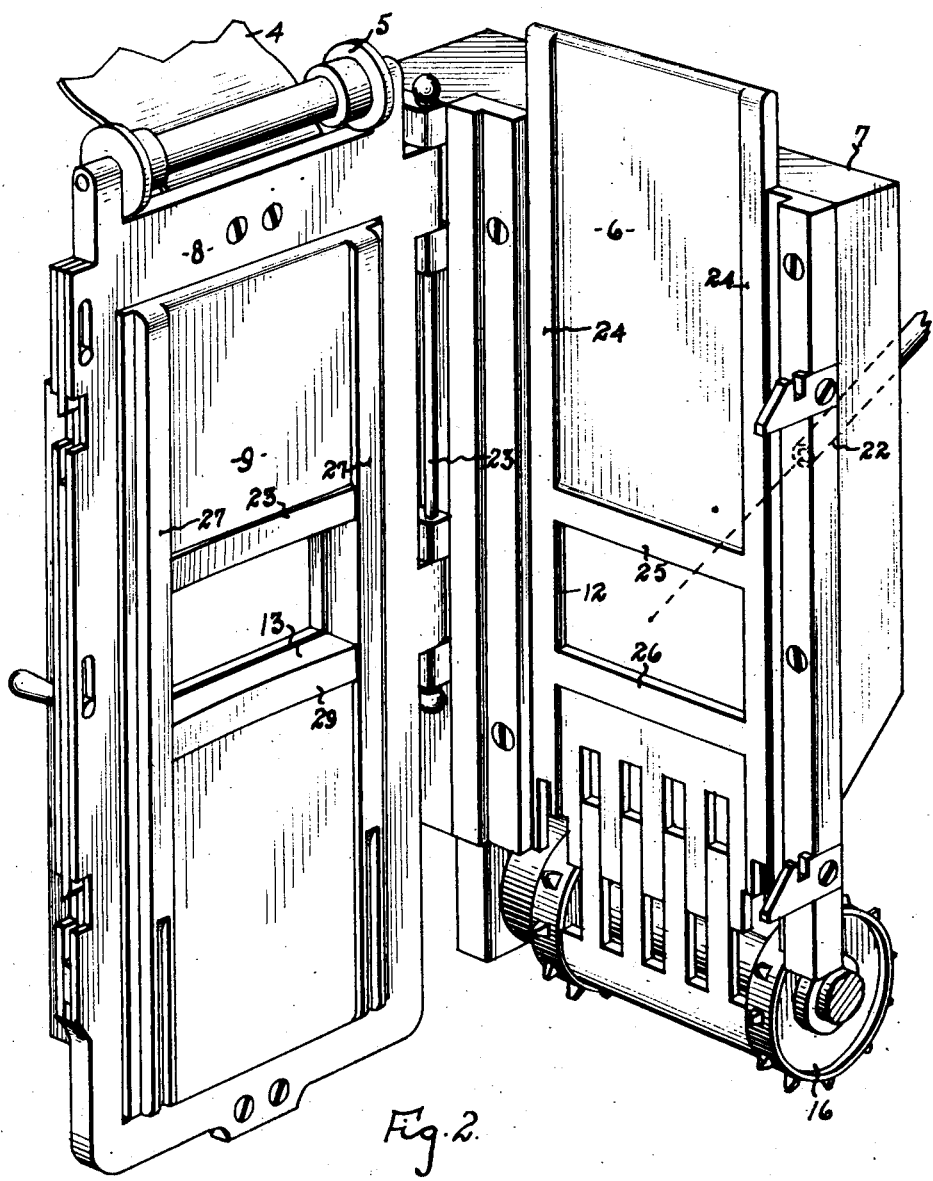
Fig. 2 is a perspective view looking into the film gate structure with the front aperture plate in open position.
Figure 3:
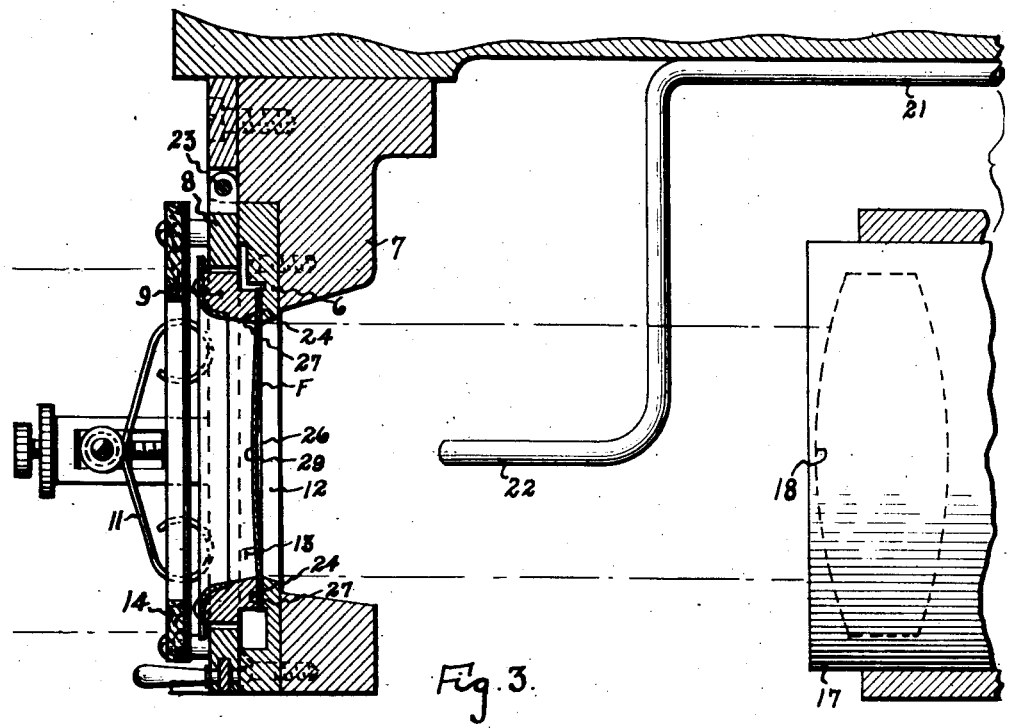
Fig. 3 is a horizontal central cross-sectional view through the apertures in the film gate taken on the line 3—3 of Fig. 1.
Figures 4, 5:
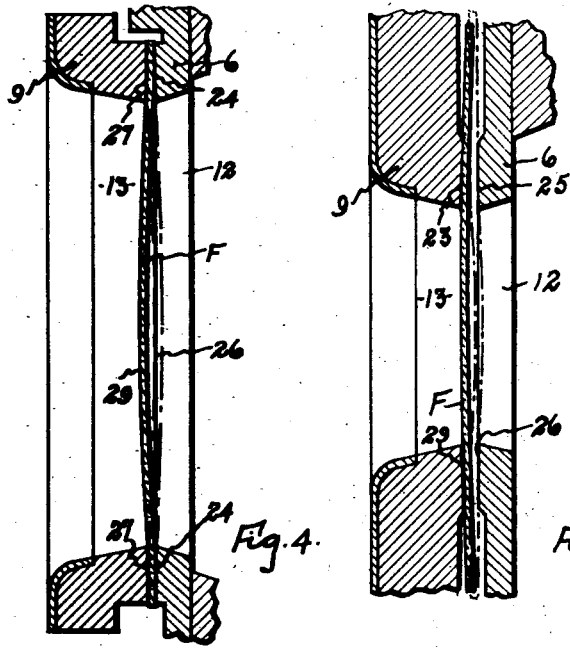
Fig. 4 is a similar, but somewhat enlarged view with most of the parts omitted to show how the film is supported at the aperture and the form it takes in accordance with this invention.
Fig. 5 is a view similar to Fig. 4 but representing a vertical central cross-sectional view through the film gate at the aperture.

As shown in Fig. 2 the rear film plate 6 is provided with a pair of vertical guide surfaces 24, which are slightly raised from the surface of the plate and which are joined by the transverse upper and lower guides 25 and 26 which frame the aperture 12. Likewise, the forward aperture plate 9 is provided with vertical guide surfaces 27 slightly raised from the surface of the plate and positioned so as to be opposite the guide surfaces 24 when the gate is closed. The aperture 13 is likewise outlined at the top and bottom by the raised guide surfaces 23 and 29 positioned to be opposite the guide surfaces 25 and 26 when the gate is closed. The guide surfaces 24 and 27 are so positioned that the edges of the film, which have the sprocket openings therein, will pass down therebetween, as indicated in Figs. 3 to 5 inclusive, and be firmly held therein by reason of the resilient pressure of aperture plate 9 under the action of the pressure springs 19. As will be clear from Figs. 2, 3 and 4, the guide surfaces 23 and 24 have a slight longitudinally curved surface, the purpose of which will shortly be described.

At 19 is a compressed air or gas pipe extending from a suitable fluid pressure source and terminating in a nozzle or discharge end 20 positioned below and within the film loop FL so that when a compressed gas is discharged therefrom it will project against the under surface of the loop and act as a support therefor.

At 21 is a second compressed air or gas pipe extending from a suitable pressure source and terminating in a nozzle or discharge end 22. The nozzle 22 is positioned, as illustrated in Fig. 1, so that it will not be in the path of the light rays travelling from the film gate aperture to the projecting lens tube. This nozzle is further so positioned that the fluid pressure medium will be directed approximately at the geometrical center of the area of the film exposed at the film gate and as nearly at right angles thereto as is possible without falling in the path of the light rays.

As previously stated, the film, during the period of projection, is at rest and, under the influence of the stream of compressed air striking the film on the face towards the lens tube, will bulge towards the light source and away from the lens tube. This bulge will approximate a portion of the surface of a sphere so that all portions of the film will be at approximately the same distance from the curved surface of the projecting lens. In other words the film will tend to assume a surface shape corresponding to that of the projection lens, with the result, especially in the case where a wide film is used, that the projected picture will not blur at the edges as would be the case if the film at the projection aperture is in a plane a right angles to the axis of projection.

To aid in this shaping action of the film at the aperture the upper and lower contact surfaces 23 and 29, framing the aperture 23, are longitudinally curved, as indicated for example in Figs. 2 and 4, so that the film may assume or approximate a spherical surface. As is clear from the drawings the curved guide surfaces 23 and 29 are on the side of the film opposite to that onto which the air stream is projected so that the film may be forced thereagainst to form the curved or spherical surface.

Furthermore the pressure of the air stream on the film at the aperture acts to prevent vibration and whipping of the film during projection under the influence of the sudden stopping of the film which occurs just before projection and the action of transmitted vibrations due to the flopping or vibration of the upper film loop.

Figures 4 and 5 indicate, in the full and dotted lines of the film F, the motion which the film may undergo at the aperture because of vibration if it is not steadied in some way. It is this vibration and trembling of the film at the aperture which is prevented by means of the air stream. It is interesting to note that if the film is not steadied in the manner described the film will be convex towards the projecting lens, rather than concave towards it, hence increasing the tendency for the projected film to blur around the edges.

The projection of an air stream against the under surface of the upper film loop FL also tends to steady the movement of the film, eliminating vibration thereof and providing, in effect, a cushion on which the loop may ride without interfering with the formation and proper movement of the loop as the film moves intermittently.

It should be noted that the jet of air or gas projected against the film at the aperture is continuously impinging upon the film so that the film is not intermittently forced from a plane surface to a curved surface, but is continuously passing into and out of the curved shape while the film is in motion, the film of course remaining in curved form during the period of projection.

From the above description it will be apparent that this invention resides in certain principles of construction and operation which may be carried out by those skilled in the art in other ways without departure from the scope of the invention. I do not, therefore, desire to be strictly limited to the structure and arrangement of the parts thereof, as disclosed for purposes of illustration, but rather to the scope of the invention as defined in the following claims.

What I seek to secure by United States Letters Patent is:

1. In a motion picture projecting apparatus, a film gate having a light aperture therein, means for intermittently feeding the film through the gate and past the aperture, and means for applying a continuous stream of gases medium under pressure against the film as exposed at the aperture so as to strike it at approximately its geometric center for the purpose of continuously forcing it against the film gate to prevent movement and vibration of the film during projection.

2. In a motion picture apparatus, a film gate having a light aperture therein, film guiding surfaces formed on the film gate at the sides of the aperture, complementary transverse surfaces at the top and bottom of the aperture being longitudinally curved, and means for directing a continuous stream of gaseous medium against the film in a direction towards the curved guide surfaces to cause the film to curve at the aperture.

3. In a motion picture projection machine, the combination comprising a film gate having a forward and a rear aperture plate each having an aperture, which apertures are in alignment, said plates having raised surfaces adjacent the aperture to form film guiding surfaces, a lens tube mounted in alignment with the apertures, and means for projecting a stream of air towards the geometric center of the aperture and away from the lens tube, the stream of air being provided to strike the film at the aperture and prevent movement thereof during projection.

4. In a motion picture projection machine, the combination comprising a film gate having a forward and a rear aperture plate each having an aperture, which apertures are in alignment, said plates having raised surfaces adjacent the aperture to form film guiding surfaces, the film guiding surfaces at the top and bottom of the aperture on the forward aperture plate being longitudinally curved, a lens tube, and means for projecting a stream of gaseous medium towards the geometric center of the apertures whereby a film at the aperture during projection will be forced against the curved guide surfaces to conform approximately to the curvature of the lens in the lens tube.

5. In a motion picture projection apparatus, the combination comprising a film gate having a pair of apertured complementary plates, the upper and lower borders of the aperture of one of the plates being longitudinally curved so as to be concave toward the lens, a lens tube mounted in alignment with the apertures, and means for directing a stream of gaseous medium towards the geometric center of the apertures and in a direction towards the longitudinally curved surfaces, whereby the film is concave toward the lens.

6. The combination with a motion picture projecting apparatus having a film gate, film feeding devices, and a lens tube, of means disposed between the film gate and the lens tube and out of the path of the light travelling from the film gate to the lens tube for projecting a single jet of air against the film on the lens tube side where it is exposed at the gate to steady the film during projection exposure.

7. In combination with a motion picture projecting apparatus including an apertured film gate, film feeding devices for intermittently feeding the film past the gate, and a lens tube, of means for projecting a continuous jet of air against the film at the gate to cause it continuously to assume a curved shape to approximate the curved shape of the lens of the lens tube as it moves into the aperture.

GEORGE K. SPOOR.